United States Patent [19]

Shah

[11] Patent Number: 4,726,984
[45] Date of Patent: Feb. 23, 1988

[54] OXYGEN BARRIER ORIENTED FILM

[75] Inventor: Gautam P. Shah, Simpsonville, S.C.

[73] Assignee: W. R. Grace & Co., Duncan, S.C.

[21] Appl. No.: 750,705

[22] Filed: Jun. 28, 1985

[51] Int. Cl.⁴ .............................................. B05D 7/00
[52] U.S. Cl. .............................. 428/216; 156/244.11;
428/35; 428/500; 428/518; 428/520; 428/349
[58] Field of Search ................ 428/516, 35, 500, 518,
428/516, 520, 349, 216; 156/244.11

[56] References Cited

U.S. PATENT DOCUMENTS

| 4,064,296 | 12/1977 | Bornstein et al. | 428/35 |
| 4,182,457 | 1/1980 | Yamada et al. | 428/35 |
| 4,254,169 | 3/1981 | Schroeder | 428/35 |
| 4,284,674 | 8/1981 | Sheptak | 428/69 |
| 4,355,721 | 8/1982 | Knott et al. | 428/35 |
| 4,400,428 | 8/1983 | Rosenthal et al. | 428/349 |
| 4,405,667 | 9/1983 | Christensen et al. | 428/35 |
| 4,421,823 | 12/1983 | Theisen et al. | 428/349 |
| 4,457,960 | 7/1984 | Newsome | 428/35 |
| 4,464,443 | 8/1984 | Farrell et al. | 428/688 |
| 4,495,249 | 1/1985 | Ohya et al. | 428/516 |
| 4,501,797 | 2/1985 | Super et al. | 428/349 |
| 4,511,610 | 4/1985 | Yazaki et al. | 428/35 |
| 4,532,189 | 7/1985 | Mueller | 428/516 |
| 4,561,920 | 12/1985 | Foster | 156/244.11 |
| 4,572,854 | 2/1986 | Dallmann et al. | 428/35 |
| 4,588,648 | 5/1986 | Krueger et al. | 428/475.8 |

FOREIGN PATENT DOCUMENTS

| 0118060 | 2/1984 | European Pat. Off. . |
| 0149321 | 7/1985 | European Pat. Off. . |
| 175451A | 7/1985 | European Pat. Off. . |
| 2534523 | 4/1984 | France . |
| 2048209 | 12/1980 | United Kingdom . |
| 2076741 | 12/1981 | United Kingdom . |
| 2139948A | 11/1984 | United Kingdom . |

OTHER PUBLICATIONS

*Barrier Plastics-Circa* 1985 by Stanley Sacharow, *Paper, Film, & Foil Converter,* Jun. 1985, pp. 118-122.

*Primary Examiner*—Edith Buffalow
*Attorney, Agent, or Firm*—John J. Toney; William D. Lee, Jr.; Mark B. Quatt

[57] ABSTRACT

A coextruded multiple layer oriented film is provided which comprises a core layer of ethylene vinyl alcohol copolymer, two intermediate adhesive layers, and two outer layers of a blend of ethylene propylene copolymer and polypropylene. A preferred embodiment of the multi-layer film exhibits excellent optical properties, and shrink properties while providing high oxygen barrier especially useful in food packaging applications.

10 Claims, 1 Drawing Figure

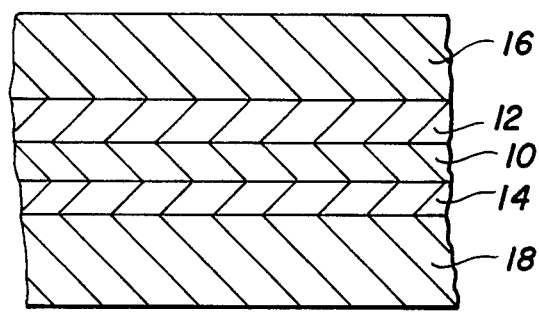

OXYGEN BARRIER ORIENTED FILM

FIELD OF THE INVENTION

This invention relates to oriented, thermoplastic films for packaging; and more particularly, this invention relates to a coextruded multi-layer, oriented, film having high oxygen barrier characteristics.

BACKGROUND OF THE INVENTION

Thermoplastic film, and in particular polyolefin materials, have been used for some time in connection with packaging of various articles including food products which require protection from the environment, an attractive appearance, and resistance to abuse during the storage and distribution cycle. Suitable optical properties are also desirable in order to provide for inspection of the packaged product after packaging, in the distribution chain, and ultimately at point of sale. Optical properties such as high gloss, high clarity, and low haze characteristics contribute to an aesthetically attractive packaging material and packaged product to enhance the consumer appeal of the product. Various polymeric materials have been used to provide lower gas permeability in order to reduce the transmission of oxygen through the packaging film and thereby retard the spoilage and extend the shelf life of products such as food items which are sensitive to oxygen.

It is also often desirable to include in a packaging film a shrink feature, i.e., the propensity of the film upon exposure to heat to shrink or, if restrained, create shrink tension within the packaging film. This property is imparted to the film by orientation of the film during its manufacture. Typically, the manufactured film is stretched in either a longitudinal (machine) direction, a transverse direction, or both, in varying degrees to impart a certain degree of shrinkability in the film upon subsequent heating. After being so stretched, the film is rapidly cooled to provide this latent shrinkability to the resulting film. One advantage of shrinkable films is the tight, smooth appearance of the wrapped product that results, providing an aesthetic package as well as protecting the packaged product from environmental abuse. Various food and non-food items may be and have been packaged in shrinkable films.

It is sometimes also desirable to orient a packaging film and thereafter heat set the film by bringing the film to a temperature near its orientation temperature. This produces a film with substantially less shrinkability, while retaining much of the advantages of orientation, including improved modulus and optical properties.

Ethylene vinyl alcohol copolymer (EVOH) is known as an oxygen barrier material, and has been used in the past in conjunction with multi-layer packaging films. U.S. Pat. No. 4,064,296 issued to Bornstein et al discloses a film formed by the coextrusion of hydrolyzed ethylene vinyl acetate (HEVA) with outside layers of, for example, ethylene vinyl acetate copolymer (EVA).

Also of interest in U.S. Pat. No. 4,464,443 issued to Farrell et al showing the use of EVOH in a multi-layer polymer structure, and including drying agents or desiccants such as sodium phosphate-di-basic and calcium chloride. EVOH, although a good barrier material, is moisture sensitive, and loses a great deal of its barrier properties at higher levels of relative humidity.

Also of interest is U.S. Pat. No. 4,457,960 issued to Newsome which discloses use of EVOH and EVOH blends in a multiple layer film. The film may be made as shrinkable film, and may be melt extruded.

Also of interest is U.S. Pat. No. 4,495,249 issued to Ohya et al and disclosing a multi-layer film with a core layer of a saponified copolymer of ethylene and vinyl acetate, and including two outer layers of a mixture of copolymer of ethylene and vinyl acetate and a copolymer of propylene and ethylene or linear low density polyethylene. The multi-layer laminate film of the reference can be made heat shrinkable and has gas barrier properties.

Also of interest is U.S. Pat. No. 4,400,428 issued to Rosenthal et al which discloses a composite film having a biaxially oriented polypropylene based film (BOPP) laminated on at least one surface with a multi-layer structure including a gas barrier layer of a hydrolyzed ethylene vinyl acetate copolymer and a layer adjacent to the base film, and a heat sealable outer layer which may be, for example, modified propylene/ethylene copolymer. Adhesion-promoting layers of modified polyolefin may include polypropylenes containing grafted units of alpha, beta-monounsaturated dicarboxylic acids.

U.S. Pat. No. 4,501,797 issued to Super et al discloses an unbalanced oriented multiple layer film including a first layer of polypropylene, a second layer of an anhydride modified polypropylene, and a third layer of ethylene vinyl alcohol.

It is an object of the present invention to provide a coextruded thermoplastic multilayer film characterized by good oxygen barrier properties over a wide range of moisture conditions.

It is a further object of the present invention to provide a thermoplastic multilayer film having an aesthetic appearance with good clarity, and other desirable optical properties.

It is another object of the present invention to provide a thin thermoplastic multilayer film having superior toughness and abrasion resistance.

It is still another object of the present invention to provide a coextruded thermoplastic multilayer film which may be totally coextruded, and oriented to provide a film with good shrink properties and good barrier properties over a wide range of moisture conditions.

It is yet another object of the present invention to provide a coextruded thermoplastic film which is oriented yet substantially shrink-free.

SUMMARY OF THE INVENTION

The present invention relates to a coextruded thermoplastic multi-layer oriented film comprising a core layer comprising ethylene vinyl alcohol copolymer; two intermediate layers, on opposite surfaces of the core layer, comprising an adhesive; and two outer layers disposed on the respective surfaces of the intermediate layers opposite the core layer, comprising a blend of 0%–100% ethylene propylene copolymer and 100%–0% polypropylene.

In another aspect of the invention, a method of making a coextruded, thermoplastic multilayer film comprises the steps of coextruding an inner layer of ethylene vinyl alcohol copolymer between two outer layers of a blend of ethylene propylene copolymer and polypropylene to form a multi-layer film; and stretching the multi-layer film to orient it.

DEFINITIONS

"Intermediate layer" and the like is used herein to define a layer in a multi-layer film enclosed on both sides by other layers.

The term "oriented" and the like is used herein to define a polymeric material in which the molecules have been aligned by a process such as racking or blown bubble process.

"Ethylene vinyl alcohol copolymer" and the like as used herein includes saponified or hydrolyzed ethylene vinyl acetate copolymers.

"Racking" as used herein is a well-known process for stretching coextruded and reheated multi-layer film by means of tenter framing or blown bubble processes.

"Ethylene propylene copolymer", "EPC", and the like, is used herein to denote polypropylene copolymerized with small amounts of ethylene comonomer.

BRIEF DESCRIPTION OF THE DRAWINGS

Further details are given below with reference to the sole drawing figure wherein FIG. 1 is a schematic cross section of a preferred embodiment of a multi-layer film of the invention.

DESCRIPTION OF THE PREFERRED EMBODIMENTS

Referring specifically to the drawings, in FIG. 1, a schematic cross section of a preferred embodiment of the coextruded multi-layer oriented film of the invention is shown. Film structure is directed to a multi-layer film having the generalized structure of A/B/C/B/A where A is an outer layer, B is an intermediate adhesive layer, and C is a core layer of a barrier material. Preferably, core layer 10 is ethylene vinyl alcohol copolymer. Intermediate layers 12 and 14 are preferably carboxylic acid or acid anhydride-modified polyolefins and more preferably polypropylene-based carboxylic acid or acid anhydride-modified polyolefins. Outer layers 16 and 18 are preferably a blend of ethylene propylene copolymer (EPC) and polypropylene (PP). These blend layers may include from 0% to 100% by weight EPC and from 100% to 0% PP, and preferably 5% to 95% EPC and 95% to 5% PP. The relative percentage of each material will be determined by the desired end use e.g. PP will be increased as increased stiffness in the final film is desired. More preferably the blend layers include between about 96% and 85% EPC and between about 15% and 4% PP; even more preferably, the blend layer includes about 92% EPC and 8% PP.

The EPC preferably comprises a blend of 2% to 5% ethylene comonomer, and more preferably between about 4 and 5% ethylene comonomer.

EXAMPLE 1

Ethylene propylene copolymer (Norchem PP 3303 GK) was blended with polypropylene (Himont PDO 64). The polypropylene was pre-blended with about 4% by weight of a silica-containing anti-blocking agent, about 5% by weight of amide waxes, and about 1% of a lubricating agent. The amide waxes and lubricating agent are well known in the art as slip agents.

The ethylene propylene copolymer contained about 4% by weight ethylene, and was blended with the propylene in a blend ratio of about 92% by weight EPC and 8% by weight PP. (The PP percentage includes the additives discussed above).

A circular coextrusion die was fed with three extruders to prepare a five layer shrink film. One extruder was used to feed the blend of EPC and polypropylene as a melt to the extrusion die to form the outer layers. Another extruder fed a polypropylene-based anhydride-modified adhesive (Modic P 310H) available from Mitsubishi to the extrusion die to provide the adhesive as intermediate layers in the multi-layer film. The third extruder provided molten EVOH (EVAL-K 102 from EVALCA) to the extrusion die. This particular EVOH has an ethylene content of about 38%. The five layer tape had a total wall thickness of about 14 mils.

The extruded tape was rapidly cooled to room temperature and collapsed by pinch rolls. The tape was subsequently heated to an orientation temperature, in the range of 105° C. to 115° C. Using a bubble technique well known in the art, internal air pressure stretched the tape to about 3.5 times its unstretched dimensions in both the longitudinal (machine) and transverse directions to form a bubble which provides biaxial orientation to the resulting film. The bubble was then rapidly cooled by chilled air in order to maintain the oriented state of the film. Finally, the bubble was collapsed and the expanded film gathered on a take-up roll. After orientation, the total wall thickness of the film was about one mil with 70% of the structure being the blend of ethylene propylene copolymer and polypropylene; 20% of the structure being the anhydride-modified adhesive layers; and the remainder or 10% of the structure being the core barrier layer.

It will be clear to one skilled in the art that the degree of stretching may be varied to obtain the desired degree of film gauge or thickness and to regulate the desired amount of shrink tension, free shrink, and other shrink properties of the final film, depending on the packaging application. Preferred stretching or racking ratios are better about 3.0 and 4.0 in both the machine and transverse directions.

In this example, the film showed tensile strengths at break of 14,450 psi in the longitudinal direction and 11,960 psi in the transverse direction (ASTM D882-81 at 73° F.). The film showed a modulus of 146,000 and 156,000 in the longitudinal and transverse directios respectively (ASTM D882-81 at 73° F.).

The film exhibited a free shrink ranging from 17% in a longitudinal direction (23% transverse direction) at 200° F. to 72% longitudinal direction (63% transverse direction) at 300° F. (ASTM D2732-70) shrink tension varied from 322 psi longitudinal (504 psi transverse) at 200° F. up to 412 psi longitudinal (462 psi transverse) at 300° F. (ASTM D2838-81).

The film also exhibited excellent optical properties including haze (2.5% at 73° F.) (ASTM D1003-61); clarity (47.8% at 73° F.) (ASTM D 1746-70) and gloss (86° at 73° F.) (ASTM D2457-70).

This film was also characterized by excellent oxygen barrier characteristics, having an oxygen transmission at 73° F., 0% relative humidity of 6.7CC STP/(24 hours, square meter atmosphere) (ASTM D3985-81).

EXAMPLE 2

A second multi-layer shrink film was made by the same method described above except that the ethylene propylene copolymer of the outer blend layer contained about 5% ethylene by weight (Cosden Dypro 7650), and the core barrier layer of ethylene vinyl alcohol copolymer comprised about 15% of the total film structure.

Physical properties for the second example was substantially similar to those described in example 1, but with a somewhat higher overall free shrink and lower haze (2.3%) and better clarity (72.3%) than in the first film produced.

Oxygen transmission was greatly improved, with 3.3CC STP at 24 hours, square meter, atmosphere conditions, at 73° F. and 0% relative humidity.

The test methodology for Example 2 in determining physical properties was the same as for Example 1.

The films of the present invention provide heat sealable outer layers, and the orientation of the film provides toughness and improves the resistance to oxygen permeability.

An important feature of the film is its thinness. The multi-layer film is preferably 0.5 to 4 mils thick, and more preferably 0.5 to 2 mils thick. One mil is equal to one thousands of an inch. It has been found that orienting the multi-layer films of the present invention is increasingly difficult for thicknesses greater than 2 mils, and very difficult or impractical for thicknesses greater than 4 mils.

Optionally, the multi-layer shrink film of the present invention may be irradiated to increase its strength particularly during the orientation process. Irradiation may be accomplished by means well known in the art, and may be varied to correspond with the desired degree of orientation or the final application of the multi-layer film.

The blend ratios of the EPC and PP may be varied according to desired properties or end-use of the multi-layer film. For example, increasing the polypropylene in the blend will add stiffness to the film, but also increase the sealing temperature of the film. Conversely, increasing the EPC in the blend tends to lower the shrink temperature of the oriented film, or to increase shrink at the same temperature, and also lowers the sealing temperature of the film. A preferred blend includes between about 4% and 15% PP and between about 96% and 85% EPC.

The multilayer film of the present invention is oriented either monoaxially or biaxially, and preferably used as a shrink film. Optionally, the oriented film may be further processed by reheating the film to a temperature near its orientation temperature, i.e. either somewhat below, at, or somewhat about its orientation temperature, to heat set the film. This future processing step has the advantage of substantially retaining many of the favorable physical characteristics of an oriented film, such as higher modulus and improved optical properties, while providing a substantial shrink-free film in applications where a shrink feature is undesirable.

Obvious modifications to the invention as described may be made by one skilled in the art without departing from the spirit and scope of the claims as presented below.

What is claimed is:

1. A coextruded thermoplastic multi-layer oriented packaging shrink film comprising:
    (a) a core layer comprising ethylene vinyl alcohol copolymer;
    (b) two intermediate layers, on opposite surfaces of the core layer, comprising polymeric adhesive;
    (c) two outer layers disposed on respective surfaces of the intermediate layers, opposite the core layer, and comprising a blend of ethylene propylene copolymer and polypropylene; and
    (d) said film having a total thickness ranging from about 0.5 to 4 mils.

2. The film in accordance with claim 1 wherein polypropylene comprises between about 4 and 15% by weight of the outer layers.

3. The film according to claim 1 wherein polypropylene comprises about 8% by weight of the outer layers.

4. The film according to claim 1 wherein the film has been oriented by racking at a racking ratio of from about 3.0 to about 4.0 in both the longitudinal and transverse directions.

5. The film according to claim 1 wherein the film has been oriented by racking at a racking ratio of about 3.5 in both the longitudinal and transverse directions.

6. The film according to claim 1 wherein the ethylene propylene copolymer of the outer layers comprises between 2% and 5% by weight of ethylene comonomer.

7. The film according to claim 1 wherein the ethylene propylene copolymer of the outer layers comprises about 4% by weight of ethylene comonomer.

8. The film according to claim 1 wherein the ethylene propylene copolymer of the outer layers comprises about 5% by weight of ethylene comonomer.

9. The film according to claim 1 having longitudinal and transverse free shrink of at least 17% at 200° F.

10. The film according to claim 1 wherein the total film thickness ranges from about 0.5 to 2 mils.

* * * * *